United States Patent [19]

Sherman

[11] Patent Number: 4,833,819
[45] Date of Patent: May 30, 1989

[54] RODENTICIDE REFILL CASSETTE

[76] Inventor: Daniel A. Sherman, 1355 Bobolink Pl., Los Angeles, Calif. 90069

[21] Appl. No.: 61,449

[22] Filed: Jul. 27, 1987

Related U.S. Application Data

[63] Continuation-in-part of Ser. No. 889,750, Sep. 29, 1986, abandoned.

[51] Int. Cl.[4] .............................................. A01M 1/20
[52] U.S. Cl. ..................................... 43/131; 206/560; 220/4 R; 220/345
[58] Field of Search ................. 43/131; 206/560, 587, 206/44 R; 220/4 F, 4 R, 345

[56] References Cited

U.S. PATENT DOCUMENTS

| | | | |
|---|---|---|---|
| 1,804,891 | 5/1931 | Newman | 43/131 |
| 3,648,831 | 3/1972 | Arnone | 206/560 |
| 3,670,872 | 6/1972 | Rock | 206/44 R |
| 3,833,143 | 9/1974 | Starkermann | 220/345 |
| 3,927,820 | 12/1975 | Wagner | 220/345 |
| 4,483,443 | 11/1984 | Worth | 206/560 |
| 4,520,925 | 6/1985 | Johnson | 206/586 |
| 4,563,836 | 1/1986 | Woodruff | 43/131 |
| 4,619,071 | 10/1986 | Willis | 43/131 |

*Primary Examiner*—Gene P. Crosby

[57] ABSTRACT

This invention relates to the safe containment of a rodenticide prior to their placement in tamper-resistant bait stations and more specifically to their containment in a device that will afford maximum protection of the baits from unauthorized contact with humans, non target species and the environment. A tray carries a rodenticide bait block and is packaged and dispensed in an outer case, or covered with a cover member, which is removed before the tray and bait is placed in a bait station feeder.

9 Claims, 3 Drawing Sheets

RODENTICIDE REFILL CASSETTE

This application is a continuation-in-part of application Ser. No. 889,750, filed Sept. 29, 1986, now abandoned.

BACKGROUND OF THE INVENTION

Rodents and their elimination have been the concern of mankind throughout recorded history. Because they spread disease, compete for food and soil and destroy foodstuffs and structures, effective and safe methods of elimination of these creatures have been a major concern to the public.

Because rodents share dwelling that humans live in and frequent, the use of poisoned baits for destroying these pests has become as menacing as the inherent dangers of the rodents themselves.

As mice and rats become immune to first generation poisoned baits, more powerful and toxic substances were needed to effectuate control and, these toxins were placed in areas accessible to children, pets and wildlife.

As more of these second generation baits reached the public the danger of contact became more pronounced and several methods of protecting and isolating these baits were developed.

These are characterized by U.S. Letters Patents Nos. such as 4,132,026 1/1979 Dodds . . . 43/131, 4,161,079 7/1979 Hill, 4,281,471 8/1981 Jenkins, 4,349,981 9/1982 Sherman, 4,031,653 6/1977 Jordon, 4,541,198 9/1985 Sherman, 4,400,904 8/1983 Baker, 1,804,891, 3/1931 Newman, 4,026,064, 3/1977 Baker, 4,619,071 9/1986, Willis 4,541,198, 8/1985 Sherman and foreign Pat. Nos. 6617388 Netherlands, 2111022 9/1972 Federal Republic of Germany.

The inventions cited above all concern themselves with the protection of poisoned baits in containers that allow access and egress by the target rodent species and are designed for direct use in the destruction of a rodent population.

All prior art depended upon the placement of bait in a sealed off area within the containment and dispensing device or the addition of poisoned baits to the baiters interior by removing a cover and introducing the poison.

In order to assure the safety of the bait, the units had to remain in a stable position and/or when introducing new bait the user needed to actually handle the poisoned substance and introduce it into the baiter manually.

The use of a rib or channel to prevent the bait in block form from moving laterally, did not, prevent the bait from being shaken loose and falling free when the containment device was inverted and therefore poison could be manipulated from the containers, with their entrance and egress ports quite easily.

In general, the prior art was defective in not providing a method or refilling the containment devices without the need to come into contact with the poisons and by ignoring the fact that these units needed to be refilled constantly as the rodents consumed the baits.

The object of the instant invention is therefore to provide the user with a device that contains the bait prior to its insertion into a bait station and to isolate these poisons from direct contact with the user as they store and displace the toxin.

Still another object of the instant invention is to provide a sealed container that totally isolates the bait prior to its use and at a time that it is most vulnerable to tampering with by children or may be within the reach of pets and wildlife.

A further object of the instant invention, and an additional defect in the prior art, is to provide a method for disposing of unused bait that has been left over after the completion of a rodent control program in a manner that protects it from contact with the environment.

Another object of the invention is to provide a premeasured and easily dispenced amount of poisoned bait that can be controlled and tailored to an individualized rodent control program and to be able to plave this portion of bait in an independent containment device without the need to come into direct contact with the toxin.

And still another object of the instant invention is to provide an integrated method of utilizing an independent containment device with a tamper resistant method of dispensing poisoned bait into these containment housings.

A further feature of the invention is to provide a method of dispencing and containment both in the placement and use of the baits that will preclude the baits from coming loose if the device is tipped or inverted.

These and other novel featrures of the art along with additional advantages and feature will become apparent when considered in conjunction with the following description and the accompanying drawings.

The scope of this invention is not limited by the drawing and description alone and the teachings of the art open a wide spectrum of advancement not beforeshown in any prior patent or disclosure.

BRIEF DESCRIPTION OF THE DRAWINGS

FIG. 2 depicts the open tray with the bait secured to its surface by the holding clips and demonstrates that the exposed bait block is now openly positioned for a rodent to knaw at.

DETAILED DESCRIPTION OF THE PREFERED EMBODIMENT

Figure 1:
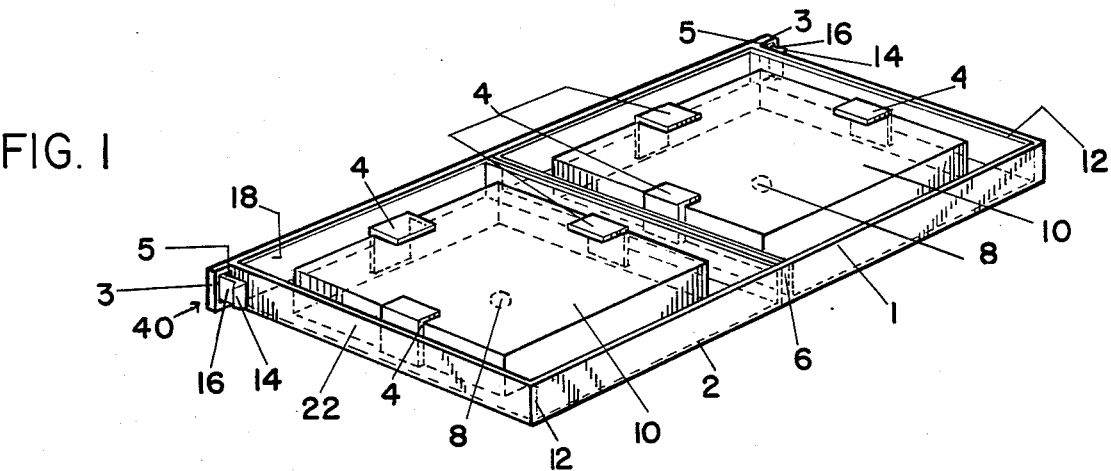
FIG. 1 show the combination of the tray and cover, locked together to form an integrated units that protects the bait from tampering by unauthorized persons. Also depicted in the locking mechanism and the positioning of the poisoned bait block within the sealed container.

As can be seen in FIG. 1, the total refill bait cassette is composed of an integrated package consisting of an outer shell 1, with an inner tray 2. The outer shell has on openings for rodents to enterthe compartment and in fact totally seals the poisoned bait 10 from contact with the surrounding environment. The tray 2 is constructed in such a manner that it contains a minimum of three walls, two rising vertically from its sides 12, and one at the front 18 to provide tracking and protection as the tray 2 is placed into the outer shell 1. The tray 2 also contains a set of spring type, dart clips 16 whos configuration points the darts outward 14 to interface and form a tight lock with the holes 5 formed in the outer case 1 and depicted in the drawings as lock structure 3. This use of reversed darts allows the user to engage the tray and shell and still be able to release them to allow exposure of the baited tray.

Figure 2:
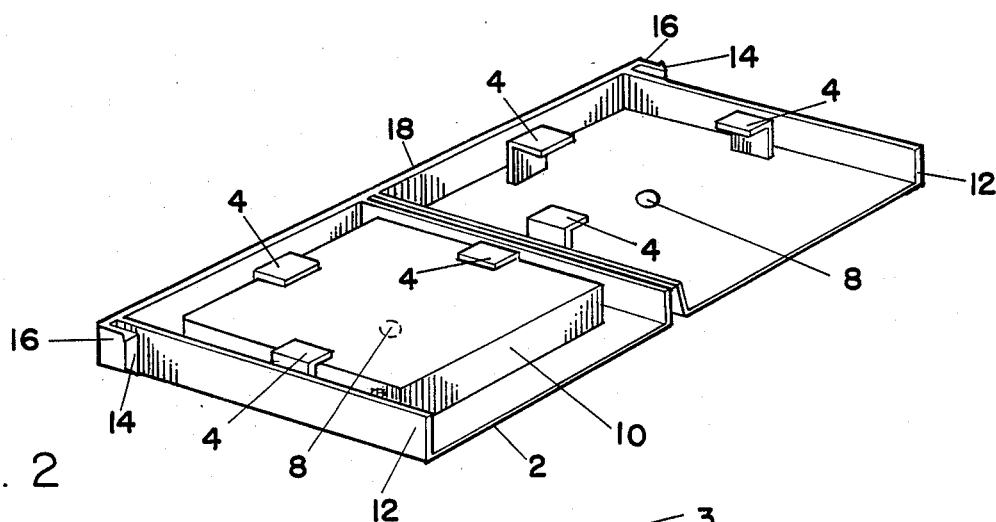

FIG. 2 details the contruction of the tray 2, which contains one or more compartments, each compartment containing a vertical inner rise that has a component a right angle to form a grip as in 4. This use of the total construction containing the right angle 4 allow the press fit of a block of poisoned bait 10 and prevents the bait from moving in all directions even if the container or tray is inverted. Also depicted are holes 8 which are formed in the base of the tray to cooperate with locator pins that may be mounted in a separate device for dispencing the bait. The front of the tray contains a wall 18 with a integral locking member at each opposing end formed as 16 that cooperates to form the child resistant closure. The back of tray 2 contains no vertical walls in order to form an access pointfrom which a rodent can easily contact the poisoned bait 10.

Figure 3:
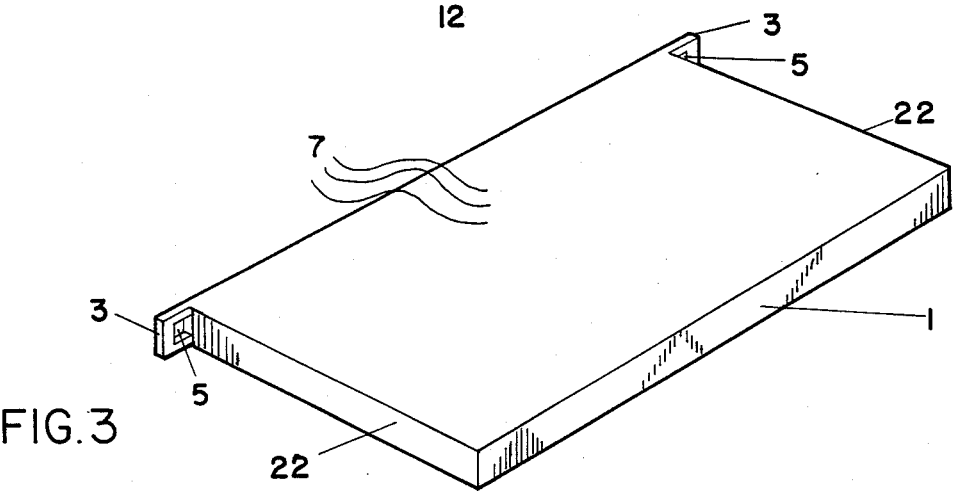
FIG. 3 shows the cover section of the cassette package demonstrating the ability of the cover to allow the passage of light to check the contents and depicting the latching mechanism of the cover that cooperates with the darts on the tray section to form a tightly sealed protective package.

FIG. 3 depicts the outer case of the refill bait cassette 1, which may be made of material that allows the transmission of light through it 7 in order to view the contents without the need to seperate the tray from the outer case. Also depicted in this figure is the cooperating lock structure 3 that consists of an elongated hollow tab with hole 5 that allows the clips located on the tray 2 to pass through and engage the two elements, tray 2 and outer case 1 into a total device for the storage and dispensing of poisoned bait.

Figure 4:
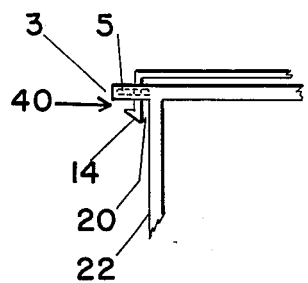
FIG. 4 is a detail of the locking mechanism that depicts the outward shape of the darts on the tray that must pass through the holes formed in the cover to secure the two together.

FIG. 4 is a detail of the locking mechanism, showing the relationship between the tray 2, wall 18, clip 16 located on the front wall 18 of the tray, and the locking hollow tabs 3 positioned on the outer case 1. Shown is the clips 16 with their tabs 14, passing through the hole 5 and engaging the structure of the outer case 3. In order for the cassette to be opened, the user must push the clips 16 towards the case in the direction of 40 and release the tabs 14 from their engagement with the structure 3. This distance is metered as 20, and provides a child resistant method of closure for the tray section 2.

Figure 5:
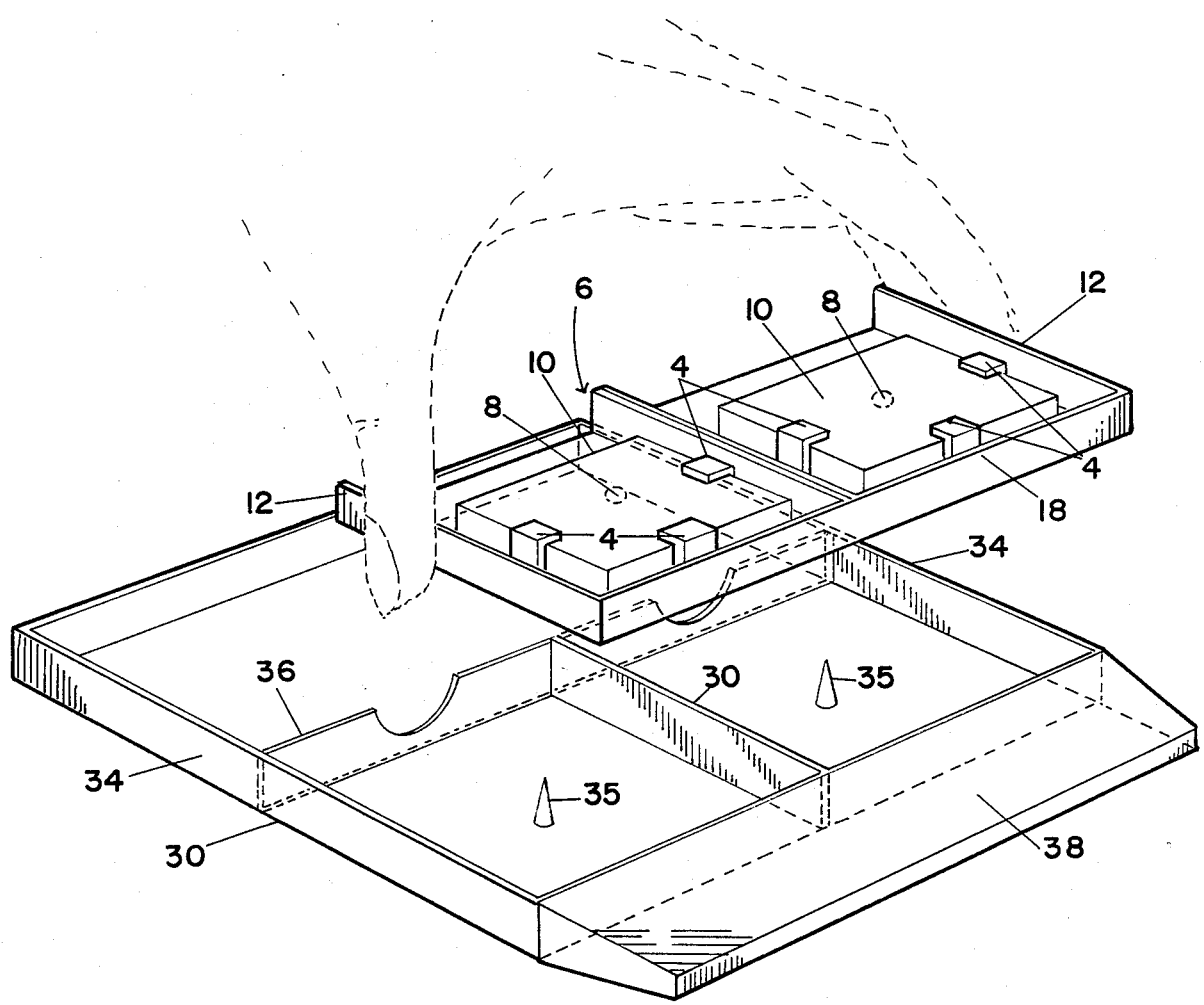
FIG. 5 show the tray section being lowered into an independent protective bait station and the cooperation between the bait that has been secured by the holding clips and the trays itself that isolated the hand from contact with the poisoned substance. The clip and its tab on each side of the tray has been omitted from the drawing for clarity.

FIG. 5 shows a hand holding the tray 2 after disengagement and removal from the outer case 1 with the bait blocks 10 secured to the surface of tray 2 by clips 4. Clip 16 and its tab 14 on each side of the tray has been omitted for clarity. The entire tray 2 is being lowered into an independent bait holder without the need to touch the poisoned bait. The holes 8 are placed over pegs located in the independent bait holder for positioning and further security of the bait.

Conversely, the tray 2 can be removed from the independent bait holder when the bait has been consumed or if the bait has been spoiled and the partially empty or empty tray 2 can be disposed of by repacing it in outer case 1 and engaging the locking tabs to form a tightly closed device for the disposal of unused bait.

Figure 6:
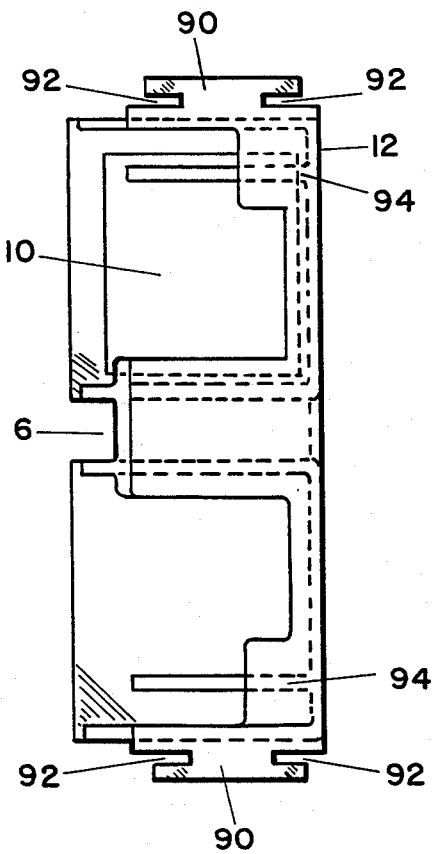
FIG. 6 shows the tray contructed with an integrated system of locking recess and bait retaining walls as part of the exterior wall structure. This is a top view of the tray component showing the bait block pressed into the recesses formed by the contruction of the outer walls of the tray.

FIG. 6 represents and alternitive construction of the bait containment tray and shows a top view of said tray. The features to be noted in this perspective are the compartments formed as 92 from the outoutward extension of the vertical walls 12 which are right angles to the wall 12 and are indicated as 90 in the drawings. Also depicted are a series inward projecting right angle extension of the wall 12 which are shown as 94. These right angle protrusions 94 form a pocket similar to that shown in FIG. 2 and indicated in that drawing as 2 that are capable of holding a block of poisoned bait in position when the unit is turned in any direction or inverted. This use of the right angle protrusions formed from the wall allow the flexability of using different dimensions of block while providing the same stability as in the right angle clips 4 of FIG. 2. Also depicted in FIG. 6 is the use of two separate compartments that allow the dispencing of two, individual, premeasured portion of bait in the same tray.

Figure 7:
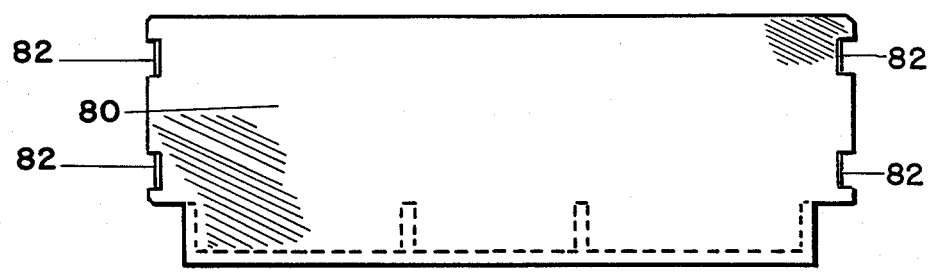
FIG. 7 provides a top view of the cooperating cover that forms a tightly closed package when used in conjunction with the tray in FIG. 6. Demonstrated is the positioning of the dart type latches and the solid structure of the cover.

FIG. 7 is a top view of the trays cover member 80, showing the position of the locking tabs 82 that cooperate with the trays notches 92 to form a tightly sealed closure.

Figure 8:
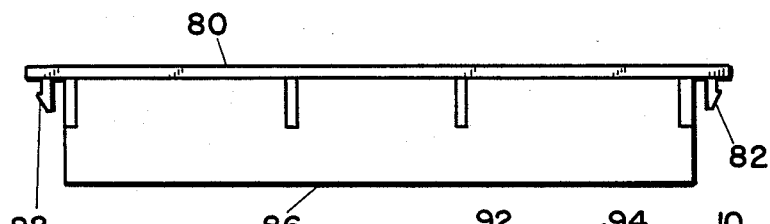
FIG. 8 is a front view of the cover depicted in FIG. 7 that more clearly demonstrates the shape of the latches and how they cooperate with the tray member.

In FIG. 8 we again see a perspective of the cover member 80 from the front view. Shown in this drawing is a vertical wall 86 extending downward from the cover member 80 and, we can see that the cover itself forms only a partial closure that cooperates with the walls of the tray 12 to form the total closed package that encloses the bait on all side only when latches 82 contained on the cover are pressed through the notches 92 in the base unit. Also depicted is the shape of the latches 82 which form an outwardly extending dart that engages the bottom of the wall 90 to form the fit between the two parts in order to open the unit after closure the multiple latches 82 must be pressed inward towards the wall 12 and then forced upward to release the cover 12.

Figure 9:
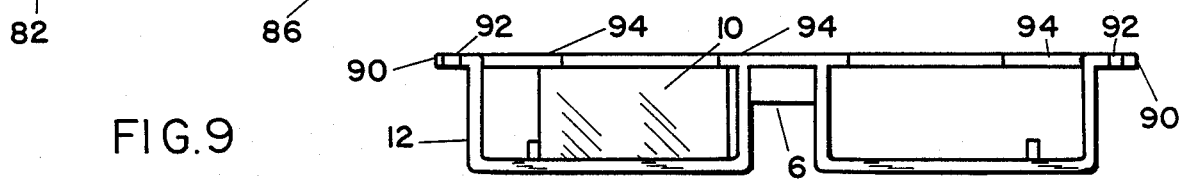
FIG. 9 is a front view of the bait tray that shows the positioning of the bait blocks and their isolation from the exterior walls while providing a space barrier from the outer edge of the trays wall structure. The relative positions of the recesses that are formed by the upright wall contruction and the right angle bends of said walls are clearly shown along with their ability to hold two separate blocks while exposing them for feeding from the target animals. The multiple latching system with their outward formed tabs, which make them difficult for small hands to open are also depicted.

FIG. 9 shows a front view of the tray unit depicting the exposed bait blocks 10 as they would be presented to the rodent after being introduced into a containment device. The side and top of the block 10 is exposed to the rodent, but, the bait is still firmly grabbed along three exterior angles of the rear and side walls by the right angle extensions of the vertical wall 12 that form the section of the tray 94. Also depicted are the outward right angle protrusions 90 with their notches 92 that allow the insertion of the cover latches 82. Tought in this drawing is the relationship between the tray wall 12 which extends along two sides and rear of the tray member and the downward extension of the cover 86 which is present to form the fourth wall when the two sections are joined together. As can be seen in this drawing the vertical walls of the tray 12 cooperate with the vertical walls of the cover 86 forming an integrated closure that covers the bait block on all four sides.

The teachings of these drawings are the basis of the invention but are not limited to those forms depicted in the drawings themselves. Overall, the use of an independent tray, containing a poisoned bait and full or partial structures used to cover and contain this basit is taught in this invention. Additionally, the use of a premeasured portion of solid bait contained within a tray and cover structure, either single, or in multi-portions is taught. The scope of the invention is taught as an overall concept in the containment of rodenticide bait blocks and their presentation to rodents.

What I claim is:

1. A tray, designed for the securing and dispencing of a rodenticide bait block; said tray having a flat surface forming a base containing a series of vertical rises; each of said rises forming an inverted L-shaped right angle; adjacent surfaces of said right angle being capable of holding a block of poisoned bait securely in place when the tray is tilted in any direction or inverted; said tray cooperating with an outer case to form a closure to protect the contents from exposure to outside tampering.

2. A tray as in claim 1; said case containing a series of holes and structure that cooperates with a spring type, dart clip.

3. A tray as in claim 1; said tray containing a spring type, dart clip that cooperates with holes and structure of the outer case to form a totally sealed unit.

4. A tray as in claim 1 wherein said base has holes through it in order to cooperate with positioning pegs located in a separate container.

5. A flat tray for the dispencing and securing a block of poisoned bait; said tray having three vertical walls; said vertical walls having an upper portion extending at right angles thereto inward to form a compartment for the securing of said bait block; said tray having a cover member containing a fourth wall to form a closure which cooperates with said tray to form a totally closed structure.

6. A tray as in claim 5, said vertical walls further extend outward to form a series of notches that cooperate with said cover member to form a tightly sealed unit.

7. A tray as in claim 6, said cover member containing a vertical wall member extending downward and forming said fourth wall that in cooperation with the three walls of the tray forms a tightly sealed unit; said cover containing latches that cooperate with the notches in said tray to form the total package.

8. A tray as in claim 1 or 5 having a centrally disposed divider to form two compartments for hold two individual portions of poisoned bait.

9. A tray as in claims 1 or 5 wherein said closure is contructed of a translucent material that will allow light to pass through it in order to wiew its contents without opening the cover member.

* * * * *